US012801646B2

(12) United States Patent
Muthu et al.

(10) Patent No.: US 12,801,646 B2
(45) Date of Patent: Nov. 17, 2026

(54) TRAINING A NEURAL DATABASE FOR EFFICIENT DOCUMENT SEARCH

(71) Applicant: Intuit Inc., Mountain View, CA (US)

(72) Inventors: Malathy Muthu, The Woodlands, TX (US); Michelle Koh, San Diego, CA (US); Rushabh Mehta, San Diego, CA (US); Jingyu Huang, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 151 days.

(21) Appl. No.: 18/822,007

(22) Filed: Aug. 30, 2024

(65) Prior Publication Data

US 2026/0064740 A1 Mar. 5, 2026

(51) Int. Cl.

*G06F 7/00* (2006.01)
*G06F 16/31* (2019.01)
*G06F 16/332* (2019.01)
*G06F 16/334* (2025.01)
*G06F 16/383* (2019.01)
*G06F 17/00* (2019.01)

(52) U.S. Cl.

CPC ........ *G06F 16/3344* (2019.01); *G06F 16/316* (2019.01); *G06F 16/3326* (2019.01); *G06F 16/383* (2019.01)

(58) Field of Classification Search

CPC ............... G06F 16/3344; G06F 16/316; G06F 16/3326; G06F 16/383
USPC .......................................................... 707/741
See application file for complete search history.

(56) References Cited

U.S. PATENT DOCUMENTS

| | | | | |
|---|---|---|---|---|
| 11,176,188 | B2 * | 11/2021 | Yerebakan | G06F 16/35 |
| 11,321,329 | B1 * | 5/2022 | Shih | G06F 16/2272 |
| 2012/0016863 | A1 * | 1/2012 | Bernhardt | G06F 16/35 707/E17.108 |
| 2021/0312223 | A1 * | 10/2021 | Klaiman | G06F 40/197 |

(Continued)

OTHER PUBLICATIONS

Devlin, Jacob et al. BERT: Pre-training of Deep Bidirectional Transformers for Language Understanding. May 24, 2019 [online]. [retrieved on Aug. 30, 2024]. Retrieved from the Internet: <https://arxiv.org/pdf/1810.04805v2>.

(Continued)

*Primary Examiner* — Pavan Mamillapalli
(74) *Attorney, Agent, or Firm* — Dinsmore & Shohl LLP

(57) ABSTRACT

Aspects of the disclosure provide a method, including: generating a plurality of text chunks by processing a document, wherein each text chunk includes: a configured portion of the document, and location metadata associated with the document; processing, with a machine learning model, a first subset of the text chunks to extract contextual metadata; processing, with the machine learning model, a second subset of the text chunks to extract index metadata; generating a first structured data file including a mapping between the contextual metadata and the location metadata; generating a second structured data file including a mapping between the index metadata and the location metadata; associating each contextual metadatum and each index metadatum with at least one text chunk based on the first structured data file and the second structured data file to generate a plurality of augmented text chunks; and training a neural database based on the augmented text chunks.

20 Claims, 9 Drawing Sheets

(56) References Cited

U.S. PATENT DOCUMENTS

| | | | | |
|---|---|---|---|---|
| 2021/0406716 | A1* | 12/2021 | Broyles | G06F 16/2379 |
| 2023/0134218 | A1* | 5/2023 | Semenov | G06F 16/355<br>382/159 |
| 2025/0355833 | A1* | 11/2025 | Saad-Falcon | G06F 16/148 |

OTHER PUBLICATIONS

Creating PDF Indexes. [online]. Adobe Inc., Last Updated on Oct. 8, 2023 [retrieved on Aug. 30, 2024]. Retrieved from the Internet: <https://helpx.adobe.com/acrobat/using/creating-pdf-indexes.html>.

Searching in PDFs. [online]. Adobe Inc., Last Updated on Oct. 30, 2023 [retrieved on Aug. 30, 2024]. Retrieved from the Internet: <https://helpx.adobe.com/acrobat/using/searching-pdfs.html>.

Thomson Reuters Checkpoint Products. URL: https://tax.thomsonreuters.com/en/checkpoint (accessed Aug. 30, 2024).

* cited by examiner (From FIG. 4A)

416

| Text Chunk ID | Text Chunk | Page Number | Contextual Metadata | Index Metadata |
|---|---|---|---|---|
| 1 | (Text of Para. A) | p | Topic 1 | Index 1, Index 2 |
| 2 | (Text of Para. B) | p | Topic 1 | Index 1, Index 2 |
| . . . | | | | |
| N | (Text of Para. N) | p | Topic 1 | Index 1, Index 2 |
| 418 | 420 | 422 | 424 | 426 |

*FIG. 4B*

430

| Text Chunk ID | Text Chunk | Page Number | Contextual Metadata | Index Metadata | Feedback |
|---|---|---|---|---|---|
| 1 | (Text of Para. A) | p | Topic 1 | Index 1, Index 2 | 1 |
| 2 | (Text of Para. B) | p | Topic 1 | Index 1, Index 2 | 0 |
| . . . | | | | | |
| N | (Text of Para. N) | p | Topic 1 | Index 1, Index 2 | 1 |
| 418 | 420 | 422 | 424 | 426 | 428 |

*FIG. 4C*

TRAINING A NEURAL DATABASE FOR EFFICIENT DOCUMENT SEARCH

BACKGROUND

Field

Aspects of the present disclosure relate to generating training data for training a neural database for retrieving information from documents.

Description of Related Art

Organizations often maintain large volumes of documents prepared for various purposes. Some documents may provide background knowledge for providing a service (e.g., accounting service, etc.), and require processing to extract applicable information. For example, an organization that develops a software application related to providing an accounting service or facilitating filing of income tax returns needs to process a large number of documents that relate to various aspects of tax laws and regulations that change every year. Since there is a lot of information included in these documents to search for identifying applicable information, there is a need for an improved method of searching a large number of documents.

SUMMARY

One aspect provides a method, including: generating a plurality of text chunks by processing a document, wherein each text chunk of the plurality of text chunks includes: a configured portion of the document, and location metadata associated with the document; processing, with a machine learning model, a first subset of the plurality of text chunks to extract contextual metadata, wherein the first subset of the plurality of text chunks is determined based on the location metadata and a first content range; processing, with the machine learning model, a second subset of the plurality of text chunks to extract index metadata, wherein the second subset of the plurality of text chunks is determined based on the location metadata and a second content range; generating a first structured data file including a mapping between the contextual metadata and the location metadata; generating a second structured data file including a mapping between the index metadata and the location metadata; associating each contextual metadatum of the contextual metadata and each index metadatum of the index metadata with at least one text chunk of the plurality of text chunks based on the first structured data file and the second structured data file to generate a plurality of augmented text chunks; and training a neural database based on the plurality of augmented text chunks.

Another aspect provides a method, including: receiving, via a user interface, a user query to retrieve information from a document; processing the user query with a trained neural database to retrieve the information from the document; receiving, from the trained neural database, an output related to the information from the document; and sending the output to the user interface, wherein the trained neural database is trained based on training data generated by: generating a plurality of text chunks by processing the document, wherein each text chunk of the plurality of text chunks includes: a configured portion of the document, and location metadata associated with the document, processing, with a machine learning model, a first subset of the plurality of text chunks to extract contextual metadata, wherein the first subset of the plurality of text chunks is determined based on the location metadata and a first content range, processing, with the machine learning model, a second subset of the plurality of text chunks to extract index metadata, wherein the second subset of the plurality of text chunks is determined based on the location metadata and a second content range, generating a first structured data file including a mapping between the contextual metadata and the location metadata, generating a second structured data file including a mapping between the index metadata and the location metadata, and associating each contextual metadatum of the contextual metadata and each index metadatum of the index metadata with at least one text chunk of the plurality of text chunks based on the first structured data file and the second structured data file to generate a plurality of augmented text chunks to use as the training data.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIGS. 4A-4C depict an illustration of data generated at various steps of the methods of generating training data to train a neural database for retrieving information from documents.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
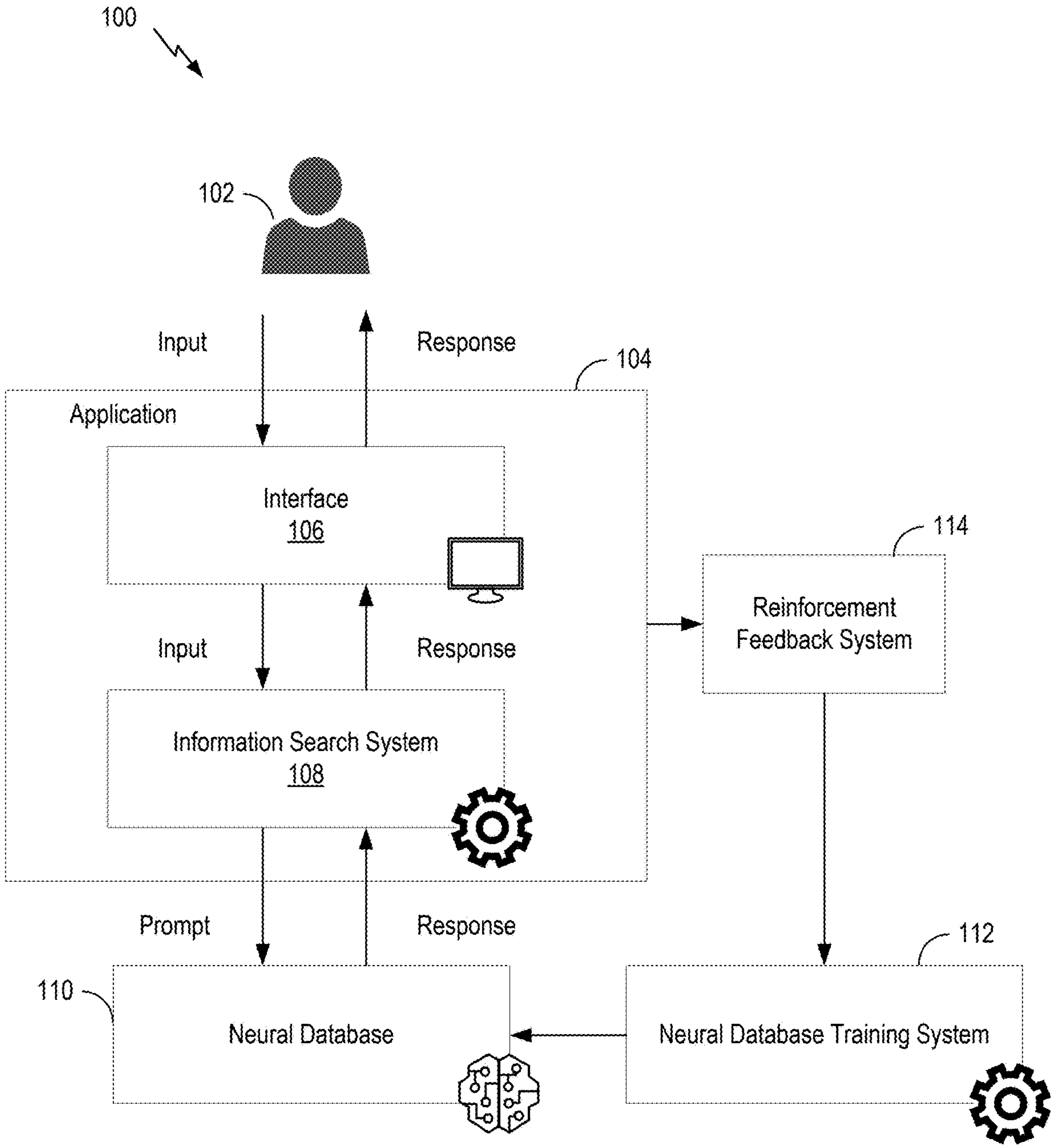
FIG. 1 depicts an example computing environment in which a neural database training system is configured to generate training data to train a neural database for retrieving information from documents.

Aspects of the present disclosure provide apparatuses, methods, processing systems, and computer-readable mediums for generating training data to train a neural database for retrieving information from documents. An example of the documents may be an instruction document, such as a manual, which provides one or more instructions related to a subject matter. For example, a tax instruction document may include one or more instructions regarding certain tax laws and/or regulations. A neural database is a system that utilizes a machine learning model (e.g., Large Language Model (LLM)) to perform search of data. A neural database may be used for efficient search of documents to retrieve information.

Aspects of the present disclosure employ an advanced data processing architecture that leverages a neural database and generative Artificial Intelligence (AI) technologies to intelligently parse and organize documents. Certain aspects of the present disclosure begin by breaking down the content of these documents into manageable "chunks" (e.g., configured units of data, such as paragraphs of text) and systematically categorizing the chunks (referred to herein as text chunks) with a machine learning model (e.g., a Generative Pre-trained Transformer 4 (GPT-4) Vision model or other multi-modal large language model). Systematically categorizing the text chunks allows certain metadata (e.g., topics, summaries, keywords, etc.) to be extracted from certain parts of the documents. These extracted metadata are combined with text chunks to generate training data (e.g., augmented text chunks) to train a neural database for retrieving information from documents. The extracted metadata form a structured index that guides a semantic search (e.g., search of information based on a query including a context of the query) via the neural database. Examples of semantic search may be based on a semantic comparison between the query and text chunks (e.g., based on their mathematical representations such as metadata using an algorithm such as k-nearest neighbors algorithm (k-NN). A semantic search guided by such structured index, described with respect to various embodiments of the present disclosure, is highly targeted, allowing for retrieval of accurate information with reduced delay. By automating the segmentation, indexing, and retrieval processes, aspects of the present disclosure reduce search times and achieve improved accuracy when compared to information retrieval via traditional database systems (e.g., without the structured index of the trained neural database described herein).

A general technical problem associated with retrieving information from documents is finding relevant information quickly and accurately. For example, one method of finding relevant information in documents may be to perform a lexical keyword search. However, a lexical keyword search merely finds literal match(es) of keyword(s), and the results may require additional processing (e.g., by a human) to identify the relevant information that satisfies the initial query. For example, a search for "tax rate" in documents related to tax laws and regulations may return a huge number of document excerpts that include the text, "tax rate." Consequently, the retrieved information may require, for example, significant time and effort for the reviewer to study in order to determine which part of it, if any, is applicable to the search query.

One solution to such inefficiency is to use a machine learning model, such as Large Language Model (LLM) to look for relevant information within documents. However, this can be a very expensive process for organizations. For example, a conventional method of using an LLM to look for relevant information from documents may include generating embeddings (e.g., numerical representations) representative of portions of the documents, storing the embeddings in a database, and performing a vector comparison between an embedding associated with an information query and the embeddings representative of portions of the documents. Thus, this process uses significant resources, such as compute and memory, which can be very costly when processed with cloud computing resources.

One solution to reducing the resource usage associated with performing vector comparisons between embeddings is to use a neural database (a database system enabled by a neural network) that maps portions of documents to a memory space (e.g., without the need for vector comparisons of embeddings for searching for certain information included in the documents). Aspects of the present disclosure describe how training data may be prepared for a neural database, such as to improve the efficiency (e.g., in associated delay and/or memory use) in retrieving information from documents.

Aspects of the present disclosure improve training of a neural database by preparing training data that provides a structured index that guides semantic search processes. Such training data results in improved efficiency in information retrieval for a trained neural database (e.g., trained based on the training data prepared according to aspects of the present disclosure) by using multiple technical improvements.

For example, the training data is prepared by segmenting documents into a plurality of "chunks" of data ("chunking"). These chunks are referred to herein as text chunks. Aspects of the present disclosure process the text chunks (e.g., subsets of text chunks) to generate multiple types of metadata. The generated metadata is then mapped to corresponding text chunks to prepare the training data. The training data may then be used to train a neural database for retrieving information from documents.

The metadata generated for the preparation of training data is associated with various portions of the documents based on information provided by the documents themselves (e.g., table of contents, index information—providing mapping of, for example, certain topics and keywords to specific locations of the documents). The context provided by such metadata based on information provided by the documents themselves may be more accurate and reliable than other artificially generated associations. The associated metadata provides the context in the training data for training a neural database. A trained neural database resulting from the training based on the training data having such context enables the trained neural database to perform a semantic search (e.g., search of information based on a query including a context of the query). Since the training described with respect to aspects of the present disclosure is based on metadata based on the reliable information included in the documents themselves, the search results from a trained neural database trained according to aspects of the present disclosure are more targeted than search results from a conventional database system. Moreover, using the trained neural database trained according to aspects of the present disclosure allows the delay associated with generating the search results to be reduced (e.g., when compared to the conventional methods). Accordingly, the training data generated by aspects of the present disclosure enable a trained neural database to perform an efficient document search that is more targeted and has a reduced delay in obtaining the search results, when compared to existing database systems.

Example Computing Environment

FIG. 1 depicts an example computing environment in which a neural database training system is configured to generate training data and to train a neural database for retrieving information from documents.

The example computing environment includes system 100, including application 104, neural database 110, and neural database training system 112. Application 104 includes interface 106 and information search system 108, and is accessed by user 102. Neural database training system 112 is used to provide neural database 110 (e.g., a neural database trained based on the training data generated by aspects of the present disclosure), and neural database training system 112 is coupled to reinforcement feedback system 114, which may be used for Reinforcement Learning with Human Feedback (RLHF).

Application 104 is used by user 102 to search for information from documents. The documents may be of any type. For example, the documents may be related to a specific industry or domain, such as tax laws and regulations that are released each year. One illustrative example of application 104 may be a programming environment for developing a software based on information retrieved from documents (e.g., for developing a software for facilitating filing of income tax returns). Other examples of application 104 may also be possible, where user 102 may retrieve information from other types of documents.

With respect to the above example regarding documents related to tax laws and regulations, as new tax laws and regulations (e.g., updated laws and regulations, including updated tax rates, etc.) are released each year, user 102 retrieves information from the released documents on application 104. For example, user 102 may search the updated tax laws and regulations and any other related documents, to find relevant information for updating a tax-related software via application 104 (e.g., to update the software to comply with the updated laws and regulations and updated tax rates, etc.). However, the volume of information included in these documents is massive (e.g., related to federal income tax, state income tax, other various laws and regulations, etc.), and they need to be adapted within a limited amount of time, as there is only a limited amount of time between when the new laws and regulations are released and when the tax-related software of this example needs to be ready to apply the new laws and regulations within its service. In this example, such process of updating the tax-related software would repeat every year. In order to assist user 102 to efficiently search documents for certain information, application 104 utilizes neural database 110 to send queries related to information that user 102 is looking for, which in turn generates responses related to the queried information.

Interface 106 of application 104 provides a user interface, by which user 102 can access information search system 108. In certain aspects, interface 106 may be a website (e.g., accessed via a web browser) or other software application user interface (UI) accessed via a user device, such as, for example, desktop computers, tablet computers, server computers, cloud-based processing devices, and others. As shown, user 102 provides inputs to application 104 via interface 106, and receives responses from application 104 via interface 106. Examples of inputs may be requests to look for certain information from documents, and examples of responses may be the requested information and/or any additional information related to the user request.

Information search system 108 is a back-end system configured for searching documents to retrieve the requested information from the documents. In certain aspects, information search system 108 is used to provide an input (e.g., a prompt) to neural database 110 to retrieve certain information from documents. The prompt may be based on the user input received via interface 106. With respect to the above example regarding documents related to tax laws and regulations, an example prompt may be related to retrieving information regarding tax rates for long-term capital gains or other tax rate information.

Neural database 110 is a neural network (NN)-based system that manages access to data such as documents. Access to the data via neural database 110 may be performed by sending a query (e.g., a prompt) to neural database 110. In certain embodiments, neural database 110 may be a remote system, accessible by one or more Application Programing Interfaces (APIs). Information search system 108 prompts neural database 110 for information based on user input received via interface 106. For example, the prompt may be based on a user input received via interface 106, and may include a question such as, for example, "what are instructions related to the personal state income tax rate for the state of Arkansas for 2024?" The response from neural database 110 may include information related to portions of a document (e.g., specific document excerpts, such as specific text chunks (e.g., as described with respect to FIGS. 2-4C)), related to personal state income tax for Arkansas for 2024.

Neural database training system 112 is configured to train a neural database to locate information related to a user query. For example, neural database training system 112 may train neural database 110 to locate information related to a user query for information from documents. Configuration of and additional details related to neural database training system 112 are described further with respect to FIGS. 2-3.

In certain aspects, reinforcement feedback system 114 is used to provide additional information to neural database training system 112, for example, to provide additional information that may be used to further train (e.g., fine-tune) neural database 110. The description related to how reinforcement feedback system 114 may be used is described further with respect to FIGS. 2-3.

As described further with respect to FIGS. 2-4C, aspects of the present disclosure (e.g., including neural database training system 112) process documents (e.g., to segment the documents into text chunks) and generate metadata based on the documents. Neural database training system 112 combines the text chunks and the metadata to generate training data (e.g., augmented text chunks) to train a neural database. Training a neural database based on the training data purposefully generated according to aspects of the present disclosure enables the trained neural database to perform a more targeted search of the documents, with a reduced delay for retrieving the requested information, when compared to traditional database systems.

For example, application 104 receives, from user 102, an input indicative of a user query regarding certain information to be retrieved from one or more documents. The input, received via interface 106, is passed to information search system 108. Information search system 108 prompts neural database 110 to perform a document search for the information included in the user query. The document search to be performed by neural database 110 includes: (1) identifying or retrieving a subset of text chunks based on the information included in the user query matching one or more instances of the metadata included in the augmented text chunks, and (2) performing a semantic search of the subset of text chunks based on the user query. For example, information search system 108 may prompt neural database 110 to retrieve a configured number of most semantically similar portions (text chunks) of the documents, with a constraint on the text chunks to be searched. In one illustrative example, if the prompt to neural database 110 is related to the personal state income tax rate for the state of Arkansas for 2024, the prompt may define "personal state income tax rate" as a constraint on the text chunks to be searched. Since neural database 110 is trained based on augmented text chunks including, for example, metadata such as topics from table of contents and/or index keywords from an index page of each document, the metadata can serve as a navigational guide for identifying the subset of text chunks to be searched. Accordingly, the training data generated according to aspects of the present disclosure enable neural database 110 to be trained such that neural database 110 can readily determine the subset of text chunks for the semantic search. Since the semantic search does not have to be performed with the other text chunks (e.g., not included in the subset of text chunks), any delay associated with performing a semantic search of the other text chunks can be mitigated. In some embodiments, information search system 108 may further prompt neural database 110 to perform the semantic search, where neural database 110 may perform, for example, a vector comparison between mathematical representations, such as embeddings, of the user query and the subset of text chunks.

Example Neural Database Training System

Figure 2:
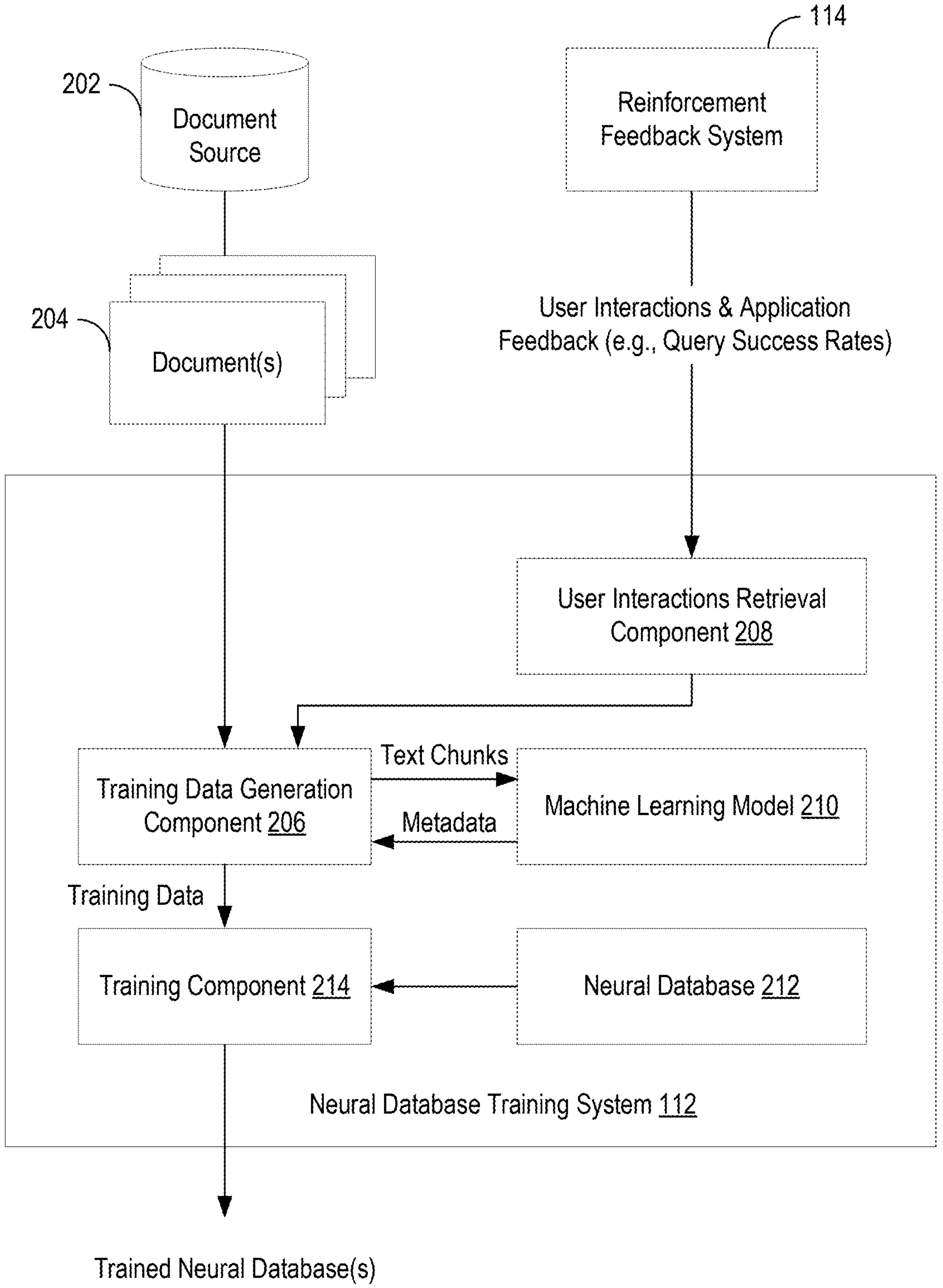
FIG. 2 depicts an example configuration of a neural database training system configured to generate training data to train a neural database for retrieving information from documents.

FIG. 2 depicts an example configuration of neural database training system 112, configured to generate training data and to train a neural database (e.g., neural database 110) for retrieving information from documents.

Neural database training system 112 includes training data generation component 206 and training component 214, where training data generation component 206 prompts machine learning model 210 to generate metadata, and training component 214 trains neural database 212. Neural database training system 112 further includes user interactions retrieval component 208.

Training data generation component 206 receives document(s) 204 from document source 202. Document source 202 may be a data repository, including a database, storing a plurality of documents (e.g., document(s) 204). Document source 202 may be available from a local data storage system (e.g., local to system 100 of FIG. 1) or a remote data storage system (e.g., which may be remotely accessed via appropriate APIs, etc.).

Document(s) 204 may be used to extract certain information pertaining to the content of document(s) 204. The extracted information is used by training data generation component 206 to generate training data for training neural database 212. In certain aspects, training data generation component 206 utilizes machine learning model 210 to generate metadata used for generating the training data at training data generation component 206. As shown, training data generation component 206 provides "text chunks" from document(s) 204 (e.g., as described further with respect to FIGS. 3-4B) to machine learning model 210 to generate metadata, including, for example, page numbers and other metadata, such as relevant topics and index keywords, associated with the text chunks.

In certain embodiments, machine learning model 210 may be a vision large language model (LLM) having optical character recognition (OCR) capabilities. For example, training data generation component 206 may prompt machine learning model 210 to determine metadata from certain portions of a document without the need to specify the specific portions of the document (e.g., a content range, such as a range of page numbers, etc.) to review. One illustrative example of this scenario may be for training data generation component 206 to prompt machine learning model 210 (e.g., a vision LLM) to generate metadata corresponding to a mapping between one or more topics or summaries and/or one or more index keywords to corresponding page number(s) of the document based on any table of contents and/or an index page included in the document. For example, the prompt to machine learning model 210 in this scenario may include: "You are good in extracting topics and page numbers from the table of contents and showing them in JSON format. Extract the topics and page numbers from the table of contents, and show them in JSON format. Every topic in the JSON file should have an associated numeric page number." This prompt may be accompanied by the document to be processed. Using the vision LLM in this way mitigates the need to pre-process the document to determine the portions (e.g., the corresponding text chunks) of the document corresponding to the table of contents and/or the index page. Mitigating the need for this pre-processing step reduces the associated delay in generation of metadata, resulting in a reduced delay for retrieving information from the document according to aspects of the present disclosure, when compared to a traditional database system that does not incorporate a vision LLM in this way.

In some embodiments where the portions, such as the range of page numbers, corresponding to a table of contents and/or an index page are readily known, machine learning model 210 may be an LLM without OCR capabilities. In this example scenario, training data generation component 206 may prompt machine learning model 210 to determine a mapping between one or more topics or summaries (e.g., from the table of contents) and/or one or more index keywords (e.g., from the index page) to corresponding page number(s) of the document by specifying the readily known portions of the document in the prompt. For example, the readily known portions of the document may be a known range of page numbers of the document corresponding to the table of contents and/or the index page. Accordingly, in this example scenario, machine learning model 210 may determine the mapping by processing a specific subset of text chunks based on the known content range (e.g., a range of page numbers) and the page numbers corresponding to the subset of text chunks.

Training component 214 is configured to train neural database 212. Training component 214 receives training data generated by training data generation component 206, and utilizes the generated training data to train neural database 212. The training by training component 214 provides a trained neural database (e.g., neural database 110 of FIG. 1). As an illustrative example, the training of neural database 212 by training component 214 may include unsupervised learning to discover patterns and/or correlations in the generated training data through cluster analysis. Other techniques, such as autoencoder to learn to reconstruct the input data without explicit labels and/or reducing dimensionality for the input data, may also be possible. Since the generated training data is based on metadata extracted from the actual document being searched, the training based on the generated training data of aspects of the present disclosure can result in improved performance (e.g., improved accuracy in inference by the resulting trained neural database), when compared to, for example, training based on arbitrary training data that is not based on the actual document being searched.

In certain aspects, neural database training system 112 further includes user interactions retrieval component 208, which is used to retrieve information related to user interactions from reinforcement feedback system 114. Examples of user interactions include, for example, how user 102 used the response from neural database 110 of FIG. 1, such as whether the information included in the response was actually used, or whether user 102 had follow up interactions to clarify their query without using the provided result. Such user interactions (e.g., user query, adjusted query, usage of the returned information, etc.) may be indicated in clickstream data from interface 106 of FIG. 1. Furthermore, user interactions may also include a response from user 102 to a user interface prompt to rate the returned information from neural database 110 as "useful" or "not useful" (e.g., for assigning a score of 1 for "useful" and a score of 0 for "not useful"). Data related to the user interactions may be used as part of training data to further fine-tune neural database 110 after its initial deployment. Additionally or alternatively, a query success rate (or score, or similar) may be monitored, too. For example, the response from neural database 110 based on user queries may be retroactively evaluated (e.g., by user 102 or a subject matter expert) to determine whether the response was correct based on the user queries. This evaluation may similarly be quantified for scoring the response from neural database 110 (e.g., a score of 1 for correct response and a score of 0 for incorrect response). User interactions retrieval component 208 retrieves the information related to the user interactions and/or the query success rates described above from reinforcement feedback system 114. User interactions retrieval component 208 then provides the retrieved information to training data generation component 206. Training data generation component 206 may further augment the previously generated training data, for example, by incorporating the retrieved information as additional layer(s) of metadata. Training component 214 may utilize the further augmented training data to fine-tune neural database 110 after its initial deployment.

Training data described with respect to FIG. 2 is generated based on metadata extracted from the document to be searched. Since the training data is generated based on information from the document to be searched itself, training of a neural database based on this training data enables the trained neural database to perform a more targeted search of the document, with a reduced delay for retrieving the requested information, when compared to traditional database systems.

Example Training Data Generation Component

Figure 3:
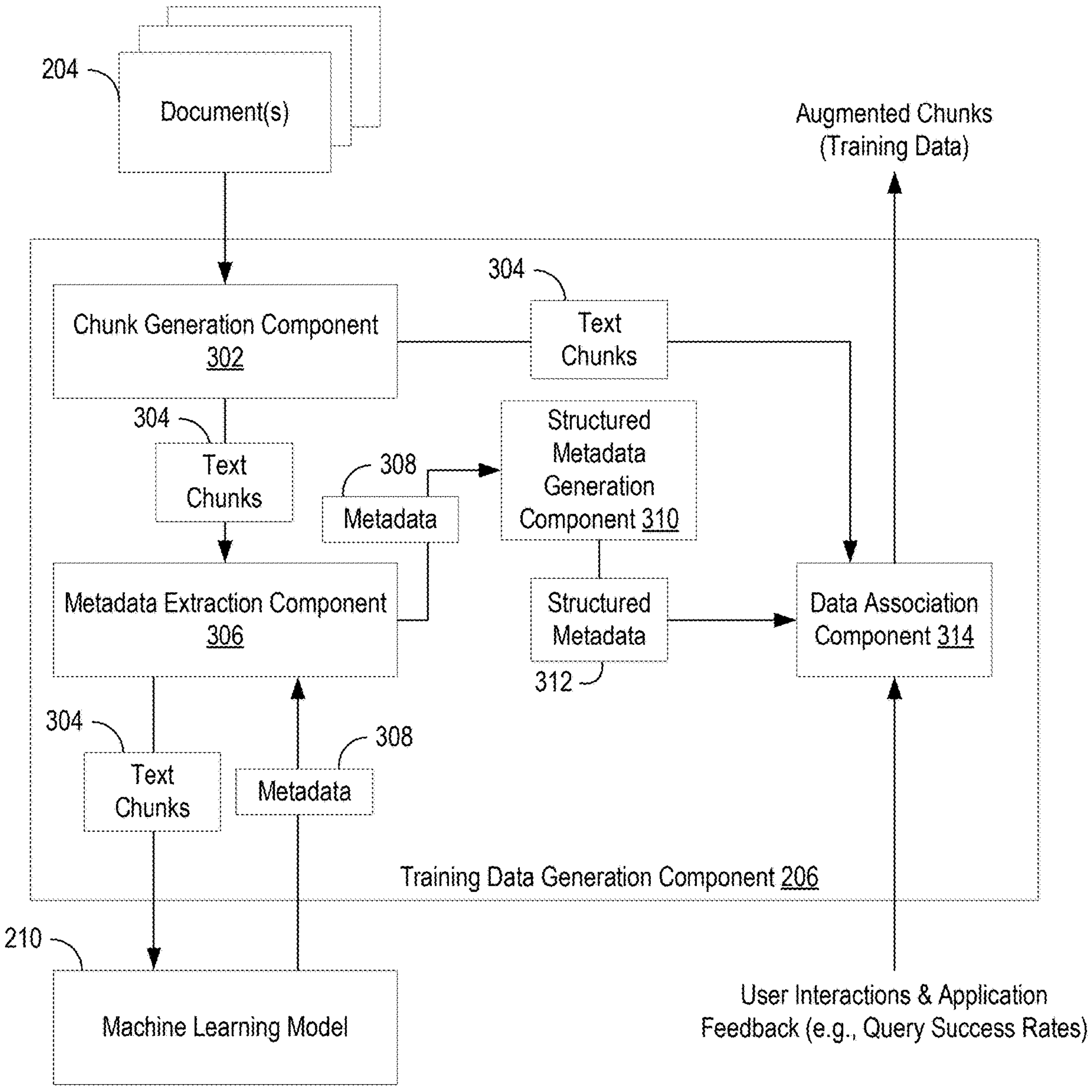
FIG. 3 depicts an example configuration of a training data generation component of the neural database training system of FIG. 2.

FIG. 3 depicts an example configuration of training data generation component 206.

Training data generation component 206 includes chunk generation component 302, metadata extraction component 306, structured metadata generation component 310, and data association component 314.

Chunk generation component 302 receives document(s) 204 (e.g., from document source 202 of FIG. 2). Chunk generation component 302 parses document(s) 204 to generate a plurality of text chunks 304. Each text chunk 304 may include a segmented portion of the content of document (s) 204. For example, each text chunk 304 may be a paragraph of text included in document(s) 204 (e.g., delineated by new line characters). Other methods of segmentation may also be possible (e.g., based on a number of characters, etc.). In some embodiments, chunk generation component 302 may be a part of a remote system, accessible by one or more APIs to segment document(s) 204. In one illustrative example, neural database 110 may provide an API for segmenting document(s) 204. Accordingly, chunk generation component 302 receives document(s) 204 as input, and segments the text content included in document(s) 204 into a plurality of text chunks 304, each including a configured amount of text (e.g., a page, a paragraph, a sentence, a line of text, a configured number of characters, etc.). Each text chunk 304 may be stored in a structured data format associating the text included in each text chunk 304 to location metadata (e.g., page number(s)). The data format of text chunk 304 is described further with respect to FIG. 4A.

Text chunks 304 are passed to metadata extraction component 306 to extract metadata 308 from text chunks 304. An example of the extracted metadata includes a mapping between location metadata (e.g., pages of document(s) 204) and topics or summaries from a table of contents and/or index keywords from an index page, as described with respect to training data generation component 206 of FIG. 2. Text chunks 304 are passed to data association component 314 to associate text chunks 304 to the extracted metadata, to generate augmented text chunks as training data. The generated training data is passed to training component 214 of FIG. 2 to train neural database 212.

Metadata extraction component 306 receives text chunks 304 from chunk generation component 302 to generate metadata 308. In certain aspects, document(s) 204 may include information to be used as metadata in certain ones of text chunks 304.

For example, document(s) 204 may include table of content (TOC) pages. A TOC may be in the first few pages of document 204, and include a list of topics included in document 204 and where each topic is described (e.g., page numbers, a range of page numbers, a starting page number, etc.). The TOC may be used for content extraction related to topics and/or summaries of information included in document 204. In some embodiments, the specific range of pages of document 204 where the TOC is located may be known (e.g., based on a publicly known format of document 204, a previous version of document 204, etc.). In such embodiments, machine learning model 210 may be an LLM prompted to extract the topics and/or summaries and their associated page numbers from the specific range of pages known to include the TOC. The extracted content (e.g., the topics and/or summaries) and their associated page numbers may be used to generate contextual metadata that maps the extracted topics and/or summaries to their associated page numbers. In certain embodiments, the specific range of pages of document 204 where the TOC is located may not be readily known. In such embodiments, machine learning model 210 may be a vision LLM having OCR capabilities and prompted to extract the topics and/or summaries and their associated page numbers based on any TOC included in the document. The prompt to the vision LLM may include a description of a TOC (e.g., a list of topics and/or summaries, each followed by page number(s) and found under a heading titled "Table of Contents"). As described with respect to FIG. 2, using the vision LLM in this way mitigates the need to pre-process document 204 to determine the portions of document 204 corresponding to the TOC even when the location of the TOC within document 204 is not readily known.

Additionally or alternatively, document(s) 204 may include index pages. An index page may be one or more pages and in the last few pages of document 204. The index page may include a list of index keywords included in document 204 and the content distribution of each index keyword in document 204 (e.g., related to individual page number(s) where an index keyword is mentioned). The index page may be used for index extraction related to index keywords that are mentioned in document 204. In some embodiments, the specific range of pages of document 204 where the index page is located may be known (e.g., based on a publicly known format of document 204, a previous version of document 204, etc.). In such embodiments, machine learning model 210 may be an LLM prompted to extract the index keywords and their associated page numbers from the specific range of pages known to include the index page. The extracted index information (e.g., the index keywords) and their associated page numbers may be used to generate index metadata that maps the extracted index keywords to their associated page numbers. In certain embodiments, the specific range of pages of document 204 where the index page is located may not be readily known. In such embodiments, machine learning model 210 may be a vision LLM having OCR capabilities and prompted to extract the index keywords and their associated page numbers based on any index page included in the document. The prompt to the vision LLM may include a description of an index page (e.g., a list of index keywords, each followed by page number(s) and found under a heading titled "Index"). As described with respect to FIG. 2 and as similarly described for TOC, using the vision LLM in this way mitigates the need to pre-process document 204 to determine the portions of document 204 corresponding to the index page even when the location of the index page within document 204 is not readily known.

Accordingly, metadata extraction component 306 may be configured to pass a configured number of text chunks (e.g., corresponding to a content range related to a TOC or an index page) to machine learning model 210 to generate metadata 308.

In certain aspects, metadata extraction component 306 utilizes structured metadata generation component 310 to generate structured metadata 312 (e.g., in JavaScript Object Notation (JSON) forms, etc.) based on extracted metadata 308. For example, structured metadata 312 may include key and value pairs for subject matter (e.g., topics, index keywords, etc.) and page number. Other structured data format, such as Extensible Markup Language (XML) format, YAML format, etc., may also be possible. Additional details regarding structured metadata 312 are described further with respect to FIG. 4A.

Data association component 314 receives text chunks 304 from chunk generation component 302 and structured metadata 312 from structured metadata generation component 310, and associates portions of text chunks 304 to portions of structured metadata 312. In some embodiments, data association component 314 parses text chunks 304 and structured metadata 312 and determines which text chunk 304 and which keyword(s) (e.g., topic(s) and/or index keyword(s)) in structured metadata 312 are associated with which location metadata (e.g., page numbers). Then, data association component 314 may determine which text chunk 304 is associated with which keyword(s) included in structured metadata 312 based on their associated location metadata (e.g., page numbers). For example, data association component 314 may determine that a text chunk 304 may be associated with a page number that is associated with certain key(s) of key and value pair(s) included in structured metadata 312. Data association component 314 may combine the text chunk 304 with the keyword(s) by adding the keyword(s) as metadata of the text chunk 304. Accordingly, data association component 314 generates "augmented" text chunks that are made of text chunks 304, combined with associated metadata, including, for example, corresponding page numbers, associated TOC topics, and/or associated index keyword information, etc. The augmented text chunks are provided to training component 214 of neural database training system 112 to be used as training data for training neural database 212, as described with respect to FIG. 2. In some aspects, the actual combining of text chunks 304 with associated metadata may be performed by a remote system (e.g., including neural database 110 of FIG. 1) accessible by one or more APIs. In this example, data association component 314 may call an API for combining text chunks 304 with the associated metadata, and the remote system may combine text chunks 304 with the associated metadata.

In certain aspects of the present disclosure, data association component 314 receives data related to user interactions and application feedback related to information retrieved from documents. For example, as described with respect to FIG. 2, data related to user interactions and application feedback may be received via user interactions retrieval component 208, and may be passed to data association component 314 to be used as additional metadata for further augmenting the training data that is generated for additional learning by neural database 110. Examples of user interactions and application feedback may include, but not be limited to, data related to user interactions and query success rates from reinforcement feedback system 114 described with respect to FIG. 1. An example of the further augmented training data is described with respect to FIG. 4C.

Example Data Format

Figure 4A:
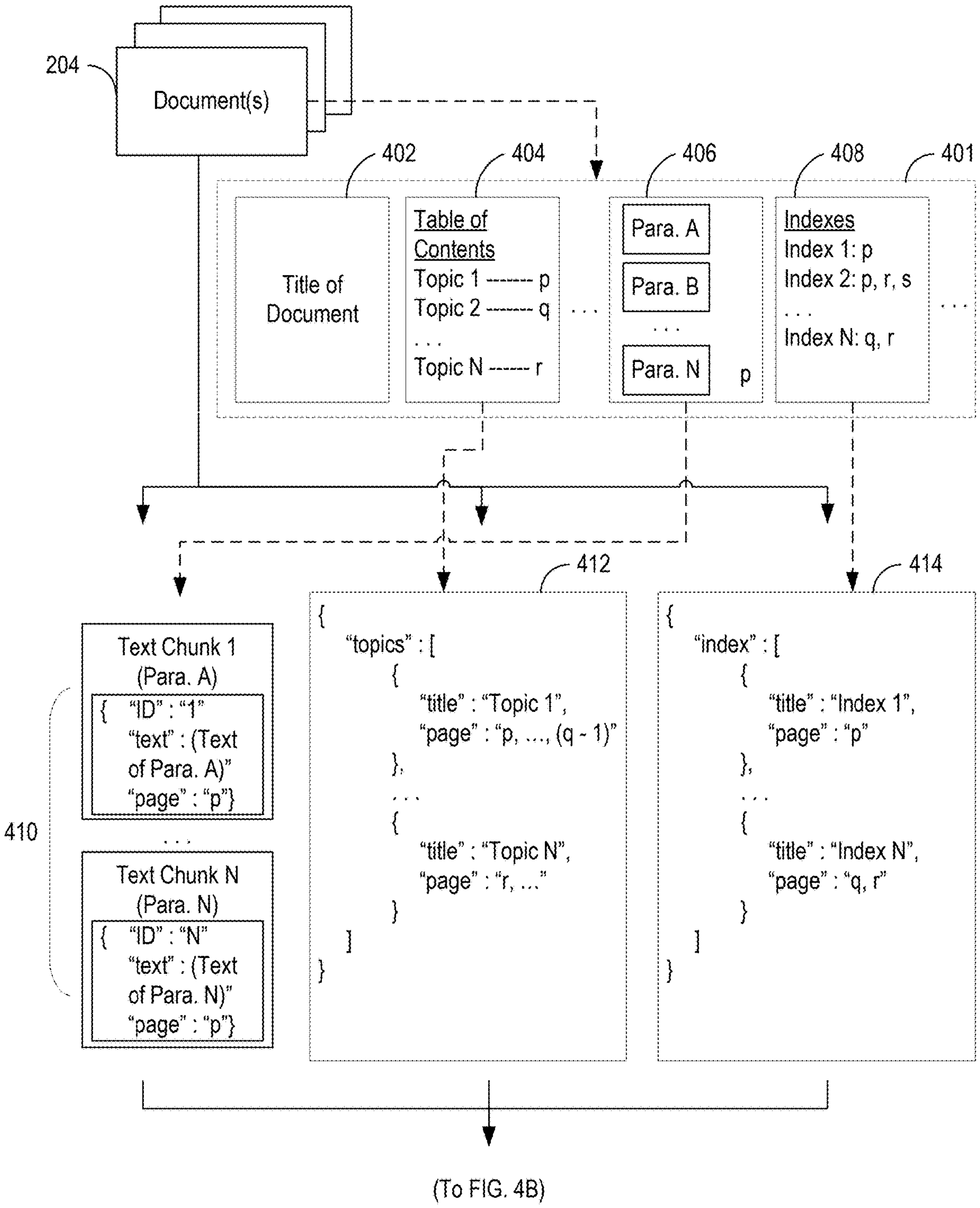

FIGS. 4A-4C depict an illustration of data generated at various steps of the methods of generating training data to train a neural database for retrieving information from documents.

As depicted in FIG. 4A, generating the training data for training a neural database starts with document(s) 204. Document(s) 204 may be any format of documents, and may be processed by chunk generation component 302 of FIG. 3 to generate a plurality of text chunks 304. An example document 401 depicts an example format of document(s) 204.

Example document 401 includes title page 402, TOC 404, text content 406, and index page 408. While only title page 402, TOC 404, text content 406, and index page 408 are depicted, other portions may also be included in example document 401. As described with respect to FIG. 3, example document 401 may be segmented into a plurality of text chunks 304. As an illustrative example, text content 406, including paragraphs A-N, is segmented into a plurality of text chunks 410 in FIG. 4A.

As an illustrative example, text chunks 410 may be stored as JSON objects, including properties such as "ID," "text," and "page." "ID" corresponds to identifying information of each text chunk (e.g., an identification number), "text" refers to the actual text of each text chunk (e.g., text of paragraph A, text of paragraph B, etc. of text content 406 included in example document 401, the original document), and "page" refers to the page number(s) associated with each text chunk (e.g., page number "p" of text content 406 included in example document 401, the original document). In some embodiments, "ID" properties may not be present in text chunks 410, and text chunks 410 may be indexed by a trained neural database.

As described with respect to FIG. 3, certain portion(s) of example document 401 (e.g., of certain text chunk(s) corresponding to TOC 404) may be extracted and used to generate contextual metadata 412. In the depicted example of FIG. 4A, contextual metadata 412 is generated based on metadata extracted from TOC 404 of example document 401 (e.g., via metadata extraction component 306 of FIG. 3). The extracted information may be processed (e.g., by structured metadata generation component 310 of FIG. 3) to generate contextual metadata 412. As shown, contextual metadata 412 may be in the form of a JSON object, including a plurality of key and value pairs, such as shown in FIG. 4A. For example, each key and value pair corresponding to a topic includes "title" and "page" as keys and the relevant topic (e.g., Topic 1) and page numbers as their respective values. Other forms of data structure, such as a list (e.g., a linked list, or similar) are also possible.

As described with respect to FIG. 3, certain portion(s) of example document 401 (e.g., of certain text chunk(s) corresponding to index page 408) may be extracted and used to generate index metadata 414. In the depicted example of FIG. 4A, index metadata 414 is generated based on metadata extracted from index page 408 (e.g., via metadata extraction component 306 of FIG. 3). The extracted information may be processed (e.g., by structured metadata generation component 310 of FIG. 3) to generate index metadata 414. As shown, index metadata 414 may be in the form of a JSON object, but other data structures are possible. For example, each key and value pair includes "title" and "page" as keys and the relevant index keyword (e.g., "Index 1") and page number(s) as their respective values.

As described with respect to FIG. 3, data association component 314 associates text chunks 410 to contextual metadata 412 and index metadata 414 by combining them to generate augmented text chunks 416 shown in FIG. 4B. For example, each augmented text chunk 416 includes text chunk identification (ID) field 418, text chunk field 420, page number field 422, contextual metadata field 424, and index metadata field 426. For each augmented text chunk 416, text chunk ID field 418, text chunk field 420, and page number field 422 may be populated based on the corresponding parts of text chunks 410 depicted in FIG. 4A (e.g., "ID," "text," and "page" properties, respectively). Contextual metadata field 424 may be populated based on mapping between the topics and relevant page numbers included in contextual metadata 412. Index metadata field 426 may be populated based on mapping between the index keywords and relevant page numbers included in index metadata 414. While each augmented text chunk 416 is depicted in FIG. 4B as a concatenation of data corresponding to the various fields of 418, 420, 422, 424, and 426, other formats are also possible, such as a JSON object with a plurality of key and value pairs, with the keys corresponding to the various fields of 418, 420, 422, 424, and 426.

As described with respect to FIG. 1, the added layers of metadata (e.g., contextual metadata 412 and index metadata 414) in augmented text chunks 416 (e.g., provided to training component 214 of FIG. 2 as training data) enable a neural database to be trained such that the added metadata provides a navigational guide for a document search (e.g., a semantic search) to be targeted to a subset of text chunks. Training a neural database based on augmented text chunks 416 allows the trained neural database to mitigate the delay associated with performing a semantic comparison between a user query and non-targeted text chunks (e.g., text chunks without any associated metadata matching the user query).

FIG. 4C depicts further augmented text chunks 430. Each further augmented text chunk 430 includes the same fields as augmented text chunk 416: text chunk ID field 418, text chunk field 420, page number field 422, contextual metadata field 424, and index metadata field 426. Additionally, further augmented text chunk 430 includes feedback field 428. For example, augmented text chunk 416 may be updated to include the additional field of feedback field 428. As described with respect to FIG. 3, data association component 314 receives data related to user interactions and application feedback related to information retrieved from documents by a trained neural database. For example, as described with respect to FIG. 2, data related to user interactions and application feedback may be received via user interactions retrieval component 208, and may be passed to data association component 314 to be used as additional metadata for further enhancing the training data that is generated for additional learning by neural database 110. Accordingly, feedback field 428 of further augmented text chunk 430 is populated based on the user interactions and application feedback retrieved via user interactions retrieval component 208. As described with respect to FIG. 2, further augmented text chunks 430 may be used for fine-tuning the trained neural database after its initial deployment.

Example User Interface

Figure 5:
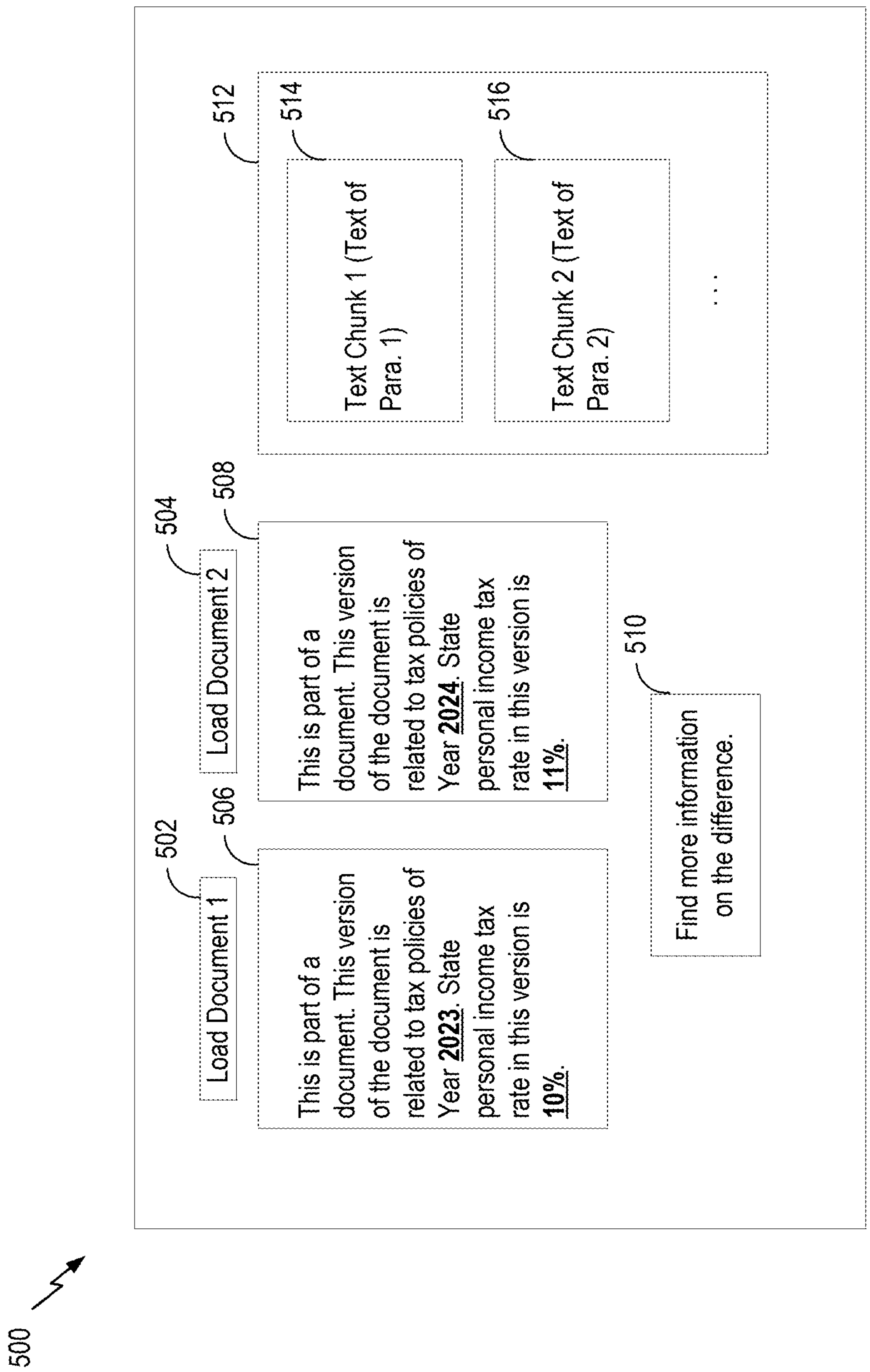
FIG. 5 depicts an illustration of a user interface for retrieving information from documents using a trained neural database.

FIG. 5 depicts an illustration of user interface 500 for retrieving information from documents using a neural database trained based on training data generated according to aspects of the present disclosure. In certain aspects, user interface 500 may be provided to user 102 via interface 106 of FIG. 1. User interface 500 includes a plurality of user interface (UI) elements. As an illustrative example, user interface 500 depicted in FIG. 5 includes a first document loading UI element 502, a second document loading UI element 504, a first document preview UI element 506, a second document preview UI element 508, and a search request UI element 510. Additionally, user interface 500 includes a text chunk preview UI element 512, which is configured to display a plurality of text chunks retrieved from a trained neural database, such as first text chunk 514 and second text chunk 516. The trained neural database may be neural database 110 of FIG. 1, coupled to interface 106 via information search system 108.

User interface 500 may be used to identify a difference between two versions of a document (e.g., a year 2023 version of the document and a year 2024 version of the document). The identified difference may be used as part of a user query to search, for example, the year 2024 version of the document to retrieve text chunk(s) related to the identified difference between the two versions of the document. This is merely an illustrative example use case scenario. Other use case scenarios are also possible.

First document loading UI element 502 and second document loading UI element 504 are configured to load a first document and a second document, respectively, in first document preview UI element 506 and second document preview UI element 508. In the illustrative example described above, user 102 of FIG. 1 may preview certain portions of the year 2023 version of the document and the year 2024 version of the document on first document preview UI element 506 and second document preview UI element 508 to identify one or more differences between the first document and the second document. The difference(s) between the first document and the second document may be identified and highlighted (e.g., automatically) on first document preview UI element 506 and second document preview UI element 508. For example, the identified differences in first document preview UI element 506 and second document preview UI element 508 depicted in FIG. 5 are shown as bolded and underlined.

In certain embodiments, search request UI element 510 is configured to automatically generate a prompt for a trained neural database to retrieve one or more text chunks, to be displayed in text chunk preview UI element 512. For example, search request UI element 510 may be configured to automatically generate a prompt, such as "retrieve information related to state personal income tax in the year 2024 version of the document" for the illustrative example depicted in FIG. 5, based on the identified differences between the year 2023 version of the document and the year 2024 version of the document. Alternatively, search request UI element 510 may be configured such that user 102 can input their own prompt based on the differences shown in first document preview UI element 506 and second document preview UI element 508.

The prompt generated via search request UI element 510 is passed to a trained neural database (e.g., neural database 110 of FIG. 1), and the retrieved text chunk(s) are shown in text chunk preview UI element 512. As described with respect to FIG. 1, the delay associated with retrieving the text chunk(s) shown in text chunk preview UI element 512 may be lower when compared to how quickly similar information may be retrieved from a traditional database system because the trained neural database of the present disclosure does not perform semantic comparisons of all portions (e.g., all text chunks) of the document to the user query. Rather, the trained neural database of the present disclosure performs semantic comparisons of the user query against a targeted subset of text chunks based on their associated page numbers. For example, the associated page numbers correspond to the information included in the user query (e.g., state personal income tax in the illustrated example). Performing semantic comparisons of the user query against only a subset of text chunks results in the reduced delay for retrieving requested information, when compared to a traditional database system that searches all portions of the document to retrieve the requested information.

Figure 6:
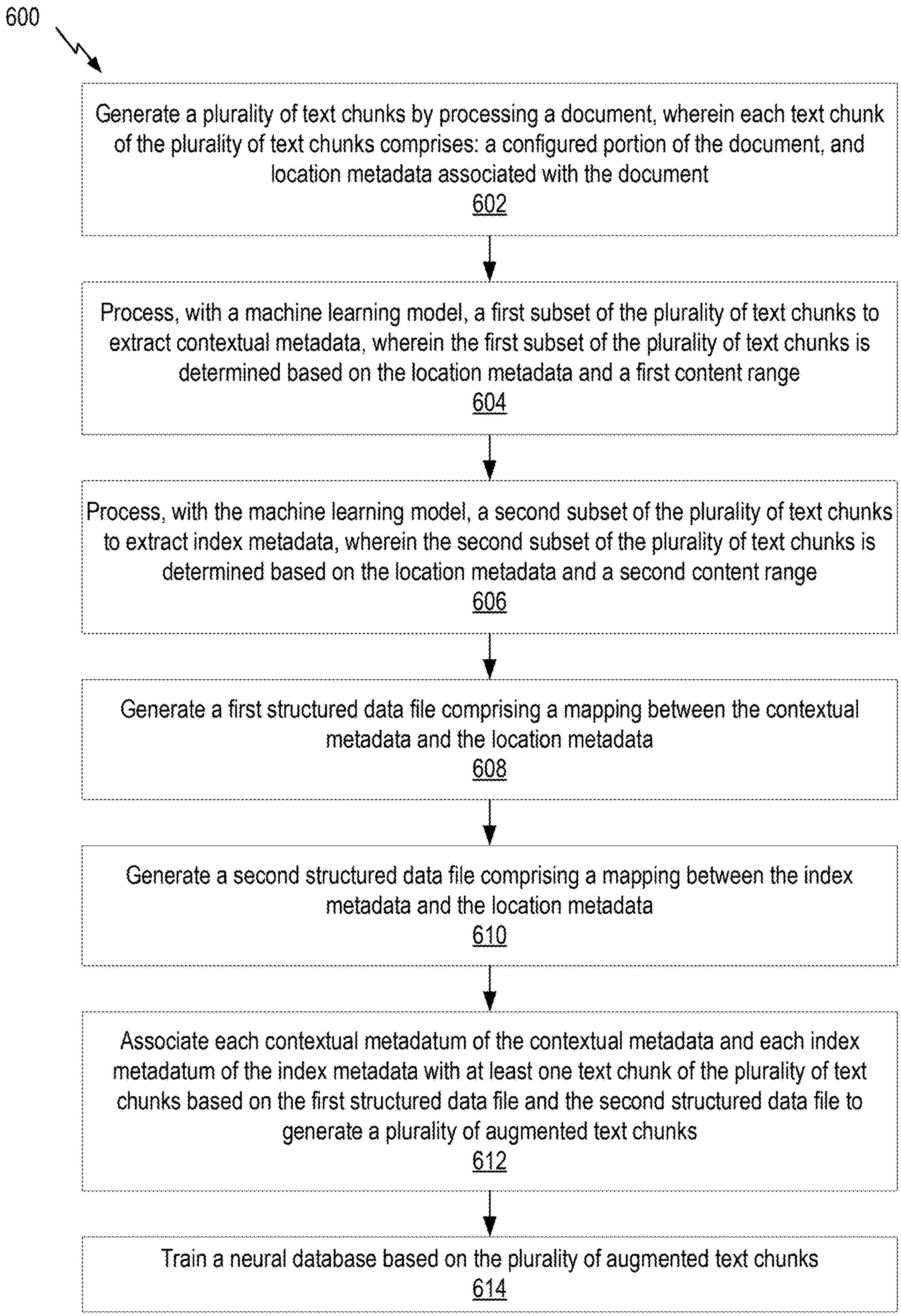
FIG. 6 depicts an example flowchart illustrating a method for generating training data to train a neural database for retrieving information from documents.

Example Methods for Training a Neural Database and for Utilizing a Trained Neural Database for Retrieving Information from Documents FIG. 6 depicts an example method 600 for training a neural database for retrieving information from documents. In one aspect, method 600 can be implemented by the system 100 of FIG. 1 (e.g., using at least training data generation component 206 described with respect to FIGS. 2-3) and/or processing system 800 of FIG. 8.

Method 600 starts at block 602 with generating a plurality of text chunks by processing a document, wherein each text chunk of the plurality of text chunks includes: a configured portion of the document, and location metadata associated with the document. As described with respect to FIG. 3, block 602 may be performed by chunk generation component 302 of FIG. 3.

Method 600 continues to block 604 with processing, with a machine learning model (e.g., machine learning model 210 described with respect to FIGS. 2-3), a first subset of the plurality of text chunks to extract contextual metadata, wherein the first subset of the plurality of text chunks is determined based on the location metadata and a first content range. The location metadata may include page numbers associated with each text chunk, and the first content range may be a range of pages that include, for example, a table of contents page including information on a plurality of topics and/or summaries included in documents and their associated page numbers. As described with respect to FIG. 3, block 604 may be performed by metadata extraction component 306 of FIG. 3. In certain embodiments, the machine learning model may be a vision large language model (LLM). In some embodiments, processing the first subset of the plurality of text chunks includes: prompting the vision LLM to: determine a portion of the document including a table of contents or summary information, and extract the contextual metadata based on the determined portion of the document including the table of contents or summary information. In certain embodiments, processing the second subset of the plurality of text chunks includes: prompting the vision LLM to: determine a portion of the document including a list of index keywords, and extract the index metadata based on the determined portion of the document including the list of index keywords.

Method 600 continues to block 606 with processing, with the machine learning model, a second subset of the plurality of text chunks to extract index metadata, wherein the second subset of the plurality of text chunks is determined based on the location metadata and a second content range. Similarly as described above with respect to block 604, the location metadata may include page numbers associated with each text chunk, and the second content range may be a range of pages that include, for example, information on a list of index keywords included in documents and their associated page numbers. Similarly as described with respect to block 604, and as described with respect to FIG. 3, block 606 may be performed by metadata extraction component 306 of FIG. 3.

Method 600 continues to block 608 with generating a first structured data file including a mapping between the contextual metadata and the location metadata. The first structured data file corresponds to structured metadata 312 described with respect to FIG. 3, and block 608 may be performed by structured metadata generation component 310 of FIG. 3. In some embodiments, the first structured data file may include: one or more of: one or more topics, or one or more summaries; and corresponding location metadata.

Method 600 continues to block 610 with generating a second structured data file including a mapping between the index metadata and the location metadata. Similarly as described with respect to block 608, the second structured data file corresponds to structured metadata 312 described with respect to FIG. 3, and block 610 may be performed by structured metadata generation component 310 of FIG. 3. In certain embodiments, the second structured data file may include one or more keywords indicative of a content distribution in the document.

Method 600 continues to block 612 with associating each contextual metadatum of the contextual metadata and each index metadatum of the index metadata with at least one text chunk of the plurality of text chunks based on the first structured data file and the second structured data file to generate a plurality of augmented text chunks. As described with respect to FIG. 3, block 612 may be performed by data association component 314 of FIG. 3.

Method 600 continues to block 614 with training a neural database based on the plurality of augmented text chunks. As described with respect to FIGS. 2-3, the augmented text chunks correspond to training data that is generated by training data generation component 206 and passed to training component 214 for training neural database 212, resulting in a trained neural database, such as neural database 110 of FIG. 1.

In some embodiments, method 600 may further include: performing, via the neural database, a semantic search of the document based on a search query from a user; and returning one or more text chunks of the plurality of text chunks based on the semantic search. For example, performing the semantic search of the document may include: determining a third subset of the plurality of text chunks by identifying one or more augmented text chunks of the plurality of augmented text chunks, including metadata that match the search query, wherein the third subset of the plurality of text chunks corresponds to the identified one or more augmented text chunks; and performing the semantic search of the third subset of the plurality of text chunks. As described with respect to FIG. 1, information search system 108 may prompt neural database 110 to perform the semantic search.

In certain embodiments, method 600 may further include: determining a plurality of user interactions related to the document; associating each user interaction of the plurality of user interactions with at least one text chunk of the plurality of text chunks to update the plurality of augmented text chunks; and training the neural database based on the plurality of updated augmented text chunks. As described with respect to FIGS. 2-3, the plurality of user interactions may be retrieved via user interactions retrieval component 208 of FIG. 2 through reinforcement feedback system 114 of FIG. 1.

In some embodiments, method 600 may further include: determining a plurality of query success rates related to the document; associating each query success rate of the plurality of query success rates with at least one text chunk of the plurality of text chunks to update the plurality of augmented text chunks; and training the neural database based on the plurality of updated augmented text chunks. Similarly as described above with respect to user interactions, the plurality of query success rates may be retrieved via user interactions retrieval component 208 of FIG. 2 through reinforcement feedback system 114 of FIG. 1.

Figure 7:
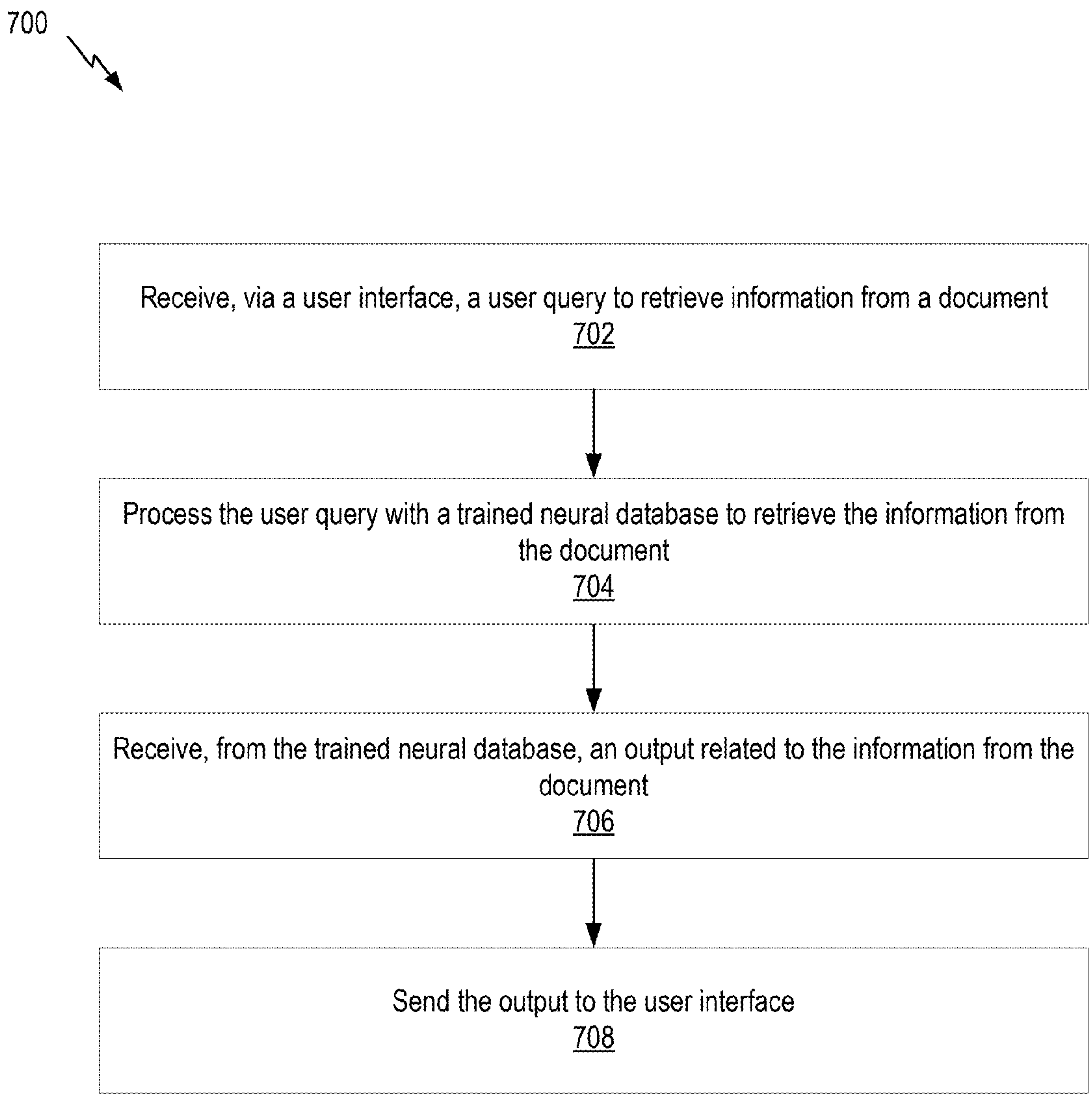
FIG. 7 depicts an example flowchart illustrating a method for retrieving information from documents using a trained neural database.

FIG. 7 depicts an example method 700 for retrieving information from documents using a trained neural database. In one aspect, method 700 can be implemented by the system 100 of FIG. 1 (e.g., using at least information search system 108) and/or processing system 800 of FIG. 8.

Method 700 starts at block 702 with receiving, via a user interface (e.g., interface 106 of FIG. 1), a user query to retrieve information from a document. As described with respect to FIG. 1, block 702 may be performed by information search system 108.

Method 700 continues to block 704 with processing the user query with a trained neural database to retrieve the information from the document. For example, as described with respect to FIG. 1, information search system 108 may prompt neural database 110 to retrieve the information from the document.

Method 700 continues to block 706 with receiving, from the trained neural database, an output related to the information from the document. Similarly as described with respect to block 704, and as described with respect to FIG. 1, block 706 may be performed by information search system 108.

Method 700 continues to block 708 with sending the output to the user interface (e.g., interface 106). As described with respect to FIG. 1, block 708 may be performed by information search system 108. The output received at the user interface may be provided as information to be viewed and/or a prompt to a user (e.g., user 102) to take an action. An illustrative example of the action that may be taken by the user on the user interface is described with respect to FIG. 5.

In some embodiments, the trained neural database of method 700 is trained based on training data generated by: generating a plurality of text chunks by processing the document, wherein each text chunk of the plurality of text chunks includes: a configured portion of the document, and location metadata associated with the document, processing, with a machine learning model, a first subset of the plurality of text chunks to extract contextual metadata, wherein the first subset of the plurality of text chunks is determined based on the location metadata and a first content range, processing, with the machine learning model, a second subset of the plurality of text chunks to extract index metadata, wherein the second subset of the plurality of text chunks is determined based on the location metadata and a second content range, generating a first structured data file including a mapping between the contextual metadata and the location metadata, generating a second structured data file including a mapping between the index metadata and the location metadata, and associating each contextual metadatum of the contextual metadata and each index metadatum of the index metadata with at least one text chunk of the plurality of text chunks based on the first structured data file and the second structured data file to generate a plurality of augmented text chunks to use as the training data.

The chunking of content included in documents (e.g., performed in block 602 and described with respect to method 700), extraction of metadata (e.g., performed in blocks 604 and 606 and described with respect to method 700), and association of information included in the extracted metadata with each text chunk (e.g., performed in block 612 and described with respect to method 700) enable various types of metadata to be generated and associated with each portion of document (e.g., based on information regarding how each metadata, such as of topics and index keywords, may be related to portion(s) of the document based on the definition included in the document itself). Because the mapping and association are based, at least in part, on the actual definition and mapping included in the document itself, the accuracy resulting from a semantic search of the document using a neural database trained based on training data generated based on method 600 is improved accordingly. Furthermore, as described with respect to FIG. 2, training data which is generated in this manner enables the trained neural database to perform a more targeted search of the document (e.g., performing a comparison between the user query and only a subset of the text chunks of the document), resulting in a reduced delay for identifying requested information from the search of the document when compared to traditional database systems.

Note that FIG. 6 and FIG. 7 are each just one example of a method, and other methods including fewer, additional, or alternative operations are possible consistent with this disclosure.

Figure 8:
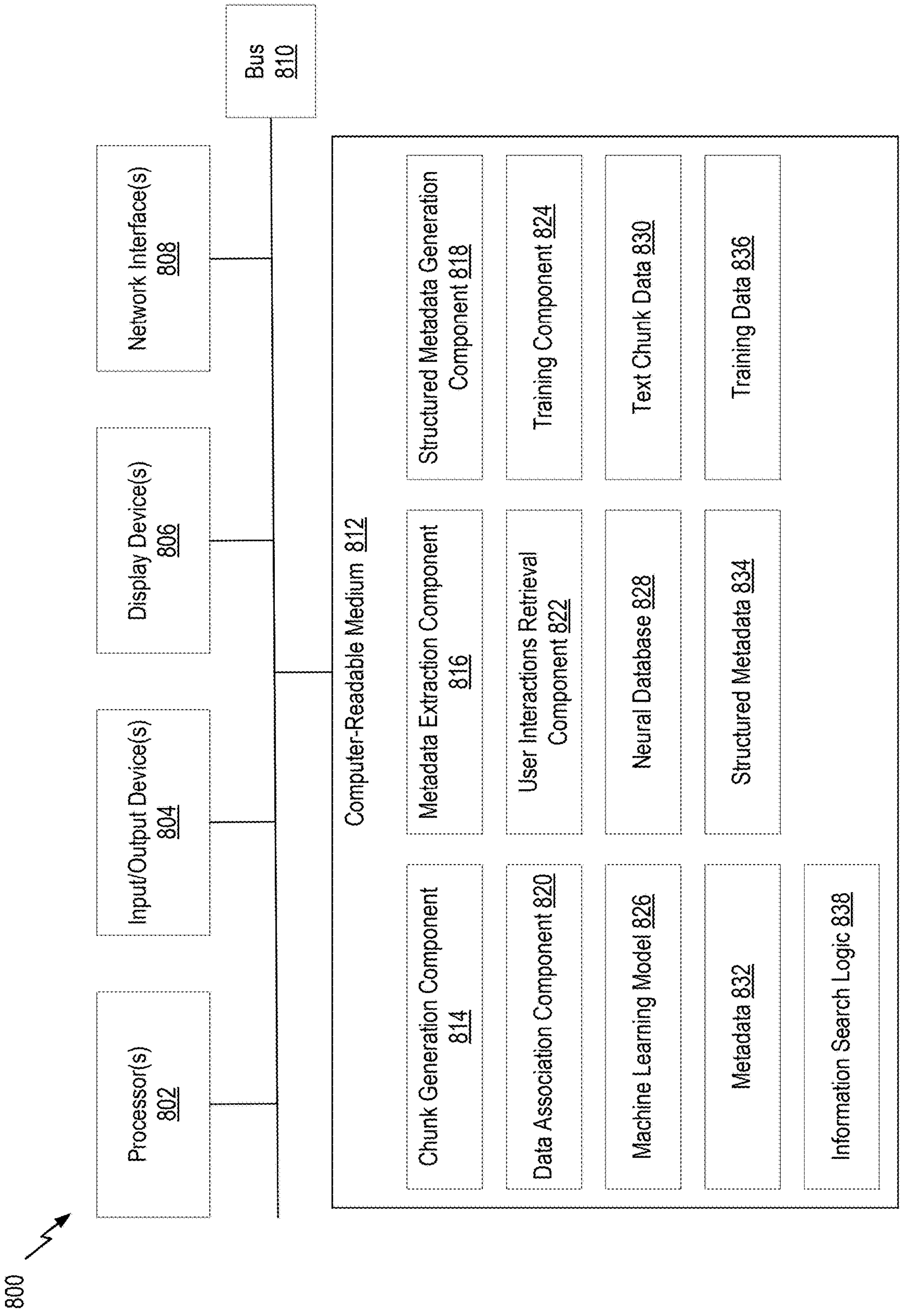
FIG. 8 depicts an example processing system with which aspects of the present disclosure can be performed.

Example Processing System for Training a Neural Database and Utilizing a Trained Neural Database for Retrieving Information From Documents FIG. 8 depicts an example processing system 800 configured to perform various aspects described herein, including, for example, methods 600 and 700 as described above with respect to FIGS. 6 and 7.

Processing system 800 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 800 includes one or more processors 802, one or more input/output devices 804, one or more display devices 806, one or more network interfaces 808 through which processing system 800 is connected to one or more networks (e.g., a local network, an intranet, the Internet, or any other group of processing systems communicatively connected to each other), and computer-readable medium 812. In the depicted example, the aforementioned components are coupled by a bus 810, which may generally be configured for data exchange amongst the components. Bus 810 may be representative of multiple buses, while only one is depicted for simplicity.

Processor(s) 802 are generally configured to retrieve and execute instructions stored in one or more memories, including local memories like computer-readable medium 812, as well as remote memories and data stores. Similarly, processor(s) 802 are configured to store application data residing in local memories like the computer-readable medium 812, as well as remote memories and data stores. More generally, bus 810 is configured to transmit programming instructions and application data among the processor(s) 802, display device(s) 806, network interface(s) 808, and/or computer-readable medium 812. In certain embodiments, processor(s) 802 are representative of one or more central processing units (CPUs), graphics processing units (GPUs), tensor processing units (TPUs), accelerators, and other processing devices.

Input/output device(s) 804 may include any device, mechanism, system, interactive display, and/or various other hardware and software components for communicating information between processing system 800 and a user of processing system 800. For example, input/output device(s) 804 may include input hardware, such as a keyboard, touch screen, button, microphone, speaker, and/or other device for receiving inputs from the user and sending outputs to the user. For example, input/output device(s) 804 may be used for receiving a user query, as performed at block 702 of method 700.

Display device(s) 806 may generally include any sort of device configured to display data, information, graphics, user interface elements, and the like to a user. For example, display device(s) 806 may include internal and external displays such as an internal display of a tablet computer or an external display for a server computer or a projector. Display device(s) 806 may further include displays for devices, such as augmented, virtual, and/or extended reality devices. In various embodiments, display device(s) 806 may be configured to display a graphical user interface.

Network interface(s) 808 provide processing system 800 with access to external networks and thereby to external processing systems. Network interface(s) 808 can generally be any hardware and/or software capable of transmitting and/or receiving data via a wired or wireless network connection. Accordingly, network interface(s) 808 can include a communication transceiver for sending and/or receiving any wired and/or wireless communication.

Computer-readable medium 812 may be a volatile memory, such as a random access memory (RAM), or a nonvolatile memory, such as nonvolatile random access memory (NVRAM), or the like. In this example, computer-readable medium 812 includes chunk generation component 814, metadata extraction component 816, structured metadata generation component 818, data association component 820, user interactions retrieval component 822, and training component 824. Chunk generation component 814, metadata extraction component 816, structured metadata generation component 818, and data association component 820 may correspond to, respectively, chunk generation component 302, metadata extraction component 306, structured metadata generation component 310, and data association component 314 of FIG. 3, and may be configured to perform the corresponding methods described with respect to, for example, FIG. 3. Additionally, chunk generation component 814, metadata extraction component 816, structured metadata generation component 818, and data association component 820 may be part of training data generation component 206 described with respect to FIG. 3.

Furthermore, user interactions retrieval component 822 and training component 824 may correspond to, respectively, user interactions retrieval component 208 and training component 214 of FIG. 2, and may be part of neural database training system 112.

Additionally, computer-readable medium 812 includes machine learning model 826 and neural database 828, corresponding to, respectively, machine learning model 210 and neural database 212 of FIG. 2. For example, machine learning model 826 may be used for extracting metadata as described with respect to FIGS. 2-3, and neural database 828 may be trained by neural database training system 112 according to the methods described herein.

Furthermore, computer-readable medium 812 stores text chunk data 830, metadata 832, and structured metadata 834, corresponding to, respectively, text chunks 304, metadata 308, and structured metadata 312, described with respect to FIG. 3. Computer-readable medium 812 also stores training data 836 that corresponds to augmented text chunks 416 described with respect to FIG. 4B.

Moreover, computer-readable medium 812 includes information search logic 838 that corresponds to information search system 108 of FIG. 1, configured to perform, for example, blocks 704, 706, and 708 of method 700 to prompt a neural database to retrieve information from documents, to receive an output from the trained neural database, and to send the output to a user interface.

Note that FIG. 8 is just one example of a processing system consistent with aspects described herein, and other processing systems having additional, alternative, or fewer components are possible consistent with this disclosure.

Example Clauses

Implementation examples are described in the following numbered clauses:

Clause 1: A method, comprising: generating a plurality of text chunks by processing a document, wherein each text chunk of the plurality of text chunks comprises: a configured portion of the document, and location metadata associated with the document; processing, with a machine learning model, a first subset of the plurality of text chunks to extract contextual metadata, wherein the first subset of the plurality of text chunks is determined based on the location metadata and a first content range; processing, with the machine learning model, a second subset of the plurality of text chunks to extract index metadata, wherein the second subset of the plurality of text chunks is determined based on the location metadata and a second content range; generating a first structured data file comprising a mapping between the contextual metadata and the location metadata; generating a second structured data file comprising a mapping between the index metadata and the location metadata; associating each contextual metadatum of the contextual metadata and each index metadatum of the index metadata with at least one text chunk of the plurality of text chunks based on the first structured data file and the second structured data file to generate a plurality of augmented text chunks; and training a neural database based on the plurality of augmented text chunks.

Clause 2: The method in accordance with Clause 1, further comprising: performing, via the neural database, a semantic search of the document based on a search query from a user; and returning one or more text chunks of the plurality of text chunks based on the semantic search.

Clause 3: The method in accordance with Clause 2, wherein performing the semantic search of the document comprises: determining a third subset of the plurality of text chunks by identifying one or more augmented text chunks of the plurality of augmented text chunks, comprising metadata that match the search query, wherein the third subset of the plurality of text chunks corresponds to the identified one or more augmented text chunks; and performing the semantic search of the third subset of the plurality of text chunks.

Clause 4: The method in accordance with any one of Clauses 1-3, wherein the machine learning model is a vision LLM.

Clause 5: The method in accordance with Clause 4, wherein processing the first subset of the plurality of text chunks comprises: prompting the vision LLM to: determine a portion of the document including a table of contents or summary information, and extract the contextual metadata based on the determined portion of the document including the table of contents or summary information.

Clause 6: The method in accordance with any one of Clauses 4-5, wherein processing the second subset of the plurality of text chunks comprises: prompting the vision LLM to: determine a portion of the document including a list of index keywords, and extract the index metadata based on the determined portion of the document including the list of index keywords.

Clause 7: The method in accordance with any one of Clauses 1-6, wherein the first structured data file comprises: one or more of: one or more topics; or one or more summaries; and corresponding location metadata.

Clause 8: The method in accordance with any one of Clauses 1-7, wherein the second structured data file comprises one or more keywords indicative of a content distribution in the document.

Clause 9: The method in accordance with any one of Clauses 1-8, further comprising: determining a plurality of user interactions related to the document; associating each user interaction of the plurality of user interactions with at least one text chunk of the plurality of text chunks to update the plurality of augmented text chunks; and training the neural database based on the plurality of updated augmented text chunks.

Clause 10: The method in accordance with any one of Clauses 1-9, further comprising: determining a plurality of query success rates related to the document; associating each query success rate of the plurality of query success rates with at least one text chunk of the plurality of text chunks to update the plurality of augmented text chunks; and training the neural database based on the plurality of updated augmented text chunks.

Clause 11: A method, comprising: receiving, via a user interface, a user query to retrieve information from a document; processing the user query with a trained neural database to retrieve the information from the document; receiving, from the trained neural database, an output related to the information from the document; and sending the output to the user interface, wherein the trained neural database is trained based on training data generated by: generating a plurality of text chunks by processing the document, wherein each text chunk of the plurality of text chunks comprises: a configured portion of the document, and location metadata associated with the document, processing, with a machine learning model, a first subset of the plurality of text chunks to extract contextual metadata, wherein the first subset of the plurality of text chunks is determined based on the location metadata and a first content range, processing, with the machine learning model, a second subset of the plurality of text chunks to extract index metadata, wherein the second subset of the plurality of text chunks is determined based on the location metadata and a second content range, generating a first structured data file comprising a mapping between the contextual metadata and the location metadata, generating a second structured data file comprising a mapping between the index metadata and the location metadata, and associating each contextual metadatum of the contextual metadata and each index metadatum of the index metadata with at least one text chunk of the plurality of text chunks based on the first structured data file and the second structured data file to generate a plurality of augmented text chunks to use as the training data.

Clause 12: The method in accordance with Clause 11, wherein the machine learning model is a vision LLM.

Clause 13: A processing system, comprising: a memory comprising computer-executable instructions; and a processor configured to execute the computer-executable instructions and cause the processing system to perform a method in accordance with any one of Clauses 1-12.

Clause 14: A processing system, comprising means for performing a method in accordance with any one of Clauses 1-12.

Clause 15: A non-transitory computer-readable medium storing program code for causing a processing system to perform the steps of any one of Clauses 1-12.

Clause 16: A computer program product embodied on a computer-readable storage medium comprising code for performing a method in accordance with any one of Clauses 1-12.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:

generating a plurality of text chunks by processing a document, wherein each text chunk of the plurality of text chunks comprises:

a configured portion of the document; and location metadata related to one or more locations of the document;

processing, with a machine learning model, a first subset of the plurality of text chunks to extract contextual information from the document and generate contextual metadata based on the extracted contextual information, wherein the first subset of the plurality of text chunks is determined based on the location metadata and a first content range;

processing, with the machine learning model, a second subset of the plurality of text chunks to extract index information from the document and generate index metadata based on the extracted index information, wherein the second subset of the plurality of text chunks is determined based on the location metadata and a second content range;

generating a first structured data file comprising a mapping between the contextual metadata and the location metadata;

generating a second structured data file comprising a mapping between the index metadata and the location metadata;

associating each contextual metadatum of the contextual metadata and each index metadatum of the index metadata with at least one text chunk of the plurality of text chunks based on the first structured data file and the second structured data file to generate a plurality of augmented text chunks that form a structured index for guiding a semantic search via a neural database; and training the neural database based on the plurality of augmented text chunks.

2. The method of claim 1, further comprising:

performing, via the neural database, the semantic search of the document based on a search query from a user; and returning one or more text chunks of the plurality of text chunks based on the semantic search.

3. The method of claim 2, wherein performing the semantic search of the document comprises:

determining a third subset of the plurality of text chunks by identifying one or more augmented text chunks of the plurality of augmented text chunks, the one or more augmented text chunks comprising metadata that match the search query, wherein the third subset of the plurality of text chunks corresponds to the identified one or more augmented text chunks; and performing the semantic search of the third subset of the plurality of text chunks.

4. The method of claim 1, wherein the machine learning model is a vision large language model (LLM).

5. The method of claim 4, wherein processing the first subset of the plurality of text chunks comprises:

prompting the vision LLM to:

determine a portion of the document including a table of contents or summary information; and extract the contextual information based on the determined portion of the document including the table of contents or the summary information.

6. The method of claim 4, wherein processing the second subset of the plurality of text chunks comprises:

prompting the vision LLM to:

determine a portion of the document including a list of index keywords; and extract the index information based on the determined portion of the document including the list of index keywords.

7. The method of claim 1, wherein the first structured data file comprises:

one or more of:

one or more topics; or one or more summaries; and corresponding location metadata corresponding to the one or more of the one or more topics or the one or more summaries.

8. The method of claim 1, wherein the second structured data file comprises one or more keywords indicative of a content distribution in the document.

9. The method of claim 1, further comprising:

determining a plurality of user interactions related to the document;

associating each user interaction of the plurality of user interactions with one or more text chunks of the plurality of text chunks to update the plurality of augmented text chunks; and training the neural database based on the plurality of updated augmented text chunks.

10. The method of claim 1, further comprising:

determining a plurality of query success rates related to the document;

associating each query success rate of the plurality of query success rates with one or more text chunks of the plurality of text chunks to update the plurality of augmented text chunks; and training the neural database based on the plurality of updated augmented text chunks.

11. A processing system, comprising: a memory comprising computer-executable instructions; and a processor configured to execute the computer-executable instructions and cause the processing system to:

generate a plurality of text chunks by processing a document, wherein each text chunk of the plurality of text chunks comprises:

a configured portion of the document; and location metadata related to one or more locations of the document;

process, with a machine learning model, a first subset of the plurality of text chunks to extract contextual information from the document and generate contextual metadata based on the extracted contextual information, wherein the first subset of the plurality of text chunks is determined based on the location metadata and a first content range;

process, with the machine learning model, a second subset of the plurality of text chunks to extract index information from the document and generate index metadata based on the extracted index information, wherein the second subset of the plurality of text chunks is determined based on the location metadata and a second content range;

generate a first structured data file comprising a mapping between the contextual metadata and the location metadata;

generate a second structured data file comprising a mapping between the index metadata and the location metadata;

associate each contextual metadatum of the contextual metadata and each index metadatum of the index metadata with at least one text chunk of the plurality of text chunks based on the first structured data file and the second structured data file to generate a plurality of augmented text chunks that form a structured index for guiding a semantic search via a neural database; and train the neural database based on the plurality of augmented text chunks.

12. The processing system of claim 11, wherein the processor is further configured to cause the processing system to:

perform, via the neural database, the semantic search of the document based on a search query from a user; and return one or more text chunks of the plurality of text chunks based on the semantic search.

13. The processing system of claim 12, wherein to cause the processing system to perform the semantic search of the document, the processor is configured to cause the processing system to:

determine a third subset of the plurality of text chunks by identifying one or more augmented text chunks of the plurality of augmented text chunks, the one or more augmented text chunks comprising metadata that match the search query, wherein the third subset of the plurality of text chunks corresponds to the identified one or more augmented text chunks; and perform the semantic search of the third subset of the plurality of text chunks.

14. The processing system of claim 11, wherein the machine learning model is a vision large language model (LLM).

15. The processing system of claim 11, wherein the first structured data file comprises:

one or more of:

one or more topics; or one or more summaries; and corresponding location metadata corresponding to the one or more of the one or more topics or the one or more summaries.

16. The processing system of claim 11, wherein the second structured data file comprises one or more keywords indicative of a content distribution in the document.

17. The processing system of claim 11, wherein the processor is further configured to cause the processing system to:

determine a plurality of user interactions related to the document;

associate each user interaction of the plurality of user interactions with one or more text chunks of the plurality of text chunks to update the plurality of augmented text chunks; and train the neural database based on the plurality of updated augmented text chunks.

18. The processing system of claim 11, wherein the processor is further configured to cause the processing system to:

determine a plurality of query success rates related to the document;

associate each query success rate of the plurality of query success rates with one or more text chunks of the plurality of text chunks to update the plurality of augmented text chunks; and train the neural database based on the plurality of updated augmented text chunks.

19. A method, comprising:

receiving, via a user interface, a user query to retrieve information from a document;

processing the user query with a trained neural database to retrieve the information from the document;

receiving, from the trained neural database, an output related to the information from the document; and sending the output to the user interface, wherein the trained neural database is trained based on training data generated by:

generating a plurality of text chunks by processing the document, wherein each text chunk of the plurality of text chunks comprises:

a configured portion of the document; and location metadata related to one or more locations of the document, processing, with a machine learning model, a first subset of the plurality of text chunks to extract contextual information from the document and generate contextual metadata based on the extracted contextual information, wherein the first subset of the plurality of text chunks is determined based on the location metadata and a first content range;

processing, with the machine learning model, a second subset of the plurality of text chunks to extract index information from the document and generate index metadata based on the extracted index information, wherein the second subset of the plurality of text chunks is determined based on the location metadata and a second content ranges;

generating a first structured data file comprising a mapping between the contextual metadata and the location metadata;

generating a second structured data file comprising a mapping between the index metadata and the location metadata; and associating each contextual metadatum of the contextual metadata and each index metadatum of the index metadata with at least one text chunk of the plurality of text chunks based on the first structured data file and the second structured data file to generate a plurality of augmented text chunks, which form a structured index for guiding a semantic search via the trained neural database, to use as the training data.

20. The method of claim 19, wherein the machine learning model is a vision large language model (LLM).

* * * * *